United States Patent
Zhang et al.

(10) Patent No.: US 9,398,521 B2
(45) Date of Patent: Jul. 19, 2016

(54) ACCESS CONTROL FAILURE HANDLING FOR HENB INBOUND MOBILITY

(75) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 127 days.

(21) Appl. No.: 13/808,805

(22) PCT Filed: Jun. 8, 2011

(86) PCT No.: PCT/JP2011/063748
§ 371 (c)(1),
(2), (4) Date: Jan. 7, 2013

(87) PCT Pub. No.: WO2012/023336
PCT Pub. Date: Feb. 23, 2012

(65) Prior Publication Data
US 2013/0137429 A1 May 30, 2013

(30) Foreign Application Priority Data

Aug. 17, 2010 (JP) ................................. 2010-182383
Sep. 16, 2010 (JP) ................................. 2010-207581

(51) Int. Cl.
*H04W 48/16* (2009.01)
*H04W 36/00* (2009.01)
(Continued)

(52) U.S. Cl.
CPC .......... *H04W 48/16* (2013.01); *H04W 36/0061* (2013.01); *H04W 48/02* (2013.01); *H04W 84/045* (2013.01)

(58) Field of Classification Search
CPC ..... H04W 16/16; H04W 36/00; H04W 36/04; H04W 36/08; H04W 36/14; H04W 36/22; H04W 36/32; H04W 36/34; H04W 36/36; H04W 36/38; H04W 48/00; H04W 48/02; H04W 48/04; H04W 48/16; H04W 84/045

USPC .............. 455/434, 435.1, 436–440, 442, 443, 455/444; 370/328, 329, 331, 338
See application file for complete search history.

(56) References Cited

U.S. PATENT DOCUMENTS

2009/0047960 A1    2/2009  Gunnarsson et al.
2010/0075635 A1*   3/2010  Lim et al. ...................... 455/411
2010/0157943 A1    6/2010  Horn

FOREIGN PATENT DOCUMENTS

CN    101742614        6/2010
WO    WO 2010/085191   7/2010

OTHER PUBLICATIONS

3GPP, "3rd Generation Partnership Project;Technical Specification Group Services and System Aspects; Architecture aspects of Home NodeB and Home eNodeB (Release 9): TR 23.830 V9.0.0 (Sep. 2009).", pp. 1-55.*

(Continued)

*Primary Examiner* — Vladimir Magloire
*Assistant Examiner* — Erica Navar
(74) *Attorney, Agent, or Firm* — Young & Thompson

(57) ABSTRACT

When MME receives Handover required from source eNB/HeNB which contains CSG ID, it verifies whether the CSG subscription data it stores is fresh or expired. If it is expired, or if MME does not have any association data for UE, MME retrieves the latest CSG subscription data from HSS. MME rewrites its stored CSG subscription data with the one retrieved from HSS, if they are different. MME performs access control for the UE according to the CSG ID received from Handover required message and its CSG subscription data. When the access control is failed, a new message List Update Indication is proposed to be sent from source eNB/HeNB to UE. In order to indicate what caused the failure, an appropriate cause in the message is proposed. Upon receiving the message, UE updates its stored CSG whitelist, such that the CSG subscription data in UE and MME are synchronized.

3 Claims, 5 Drawing Sheets

(51) Int. Cl.
*H04W 48/02* (2009.01)
*H04W 84/04* (2009.01)

(56) References Cited

OTHER PUBLICATIONS

International Search Report, PCT/JP2011/063748, Sep. 30, 2011.
3GPP TS 36.300, "Evolved Universal Terrestrial Radio Access (E-UTRA) and Evolved Universal Terrestrial Radio Access Network (E-UTRAN); Overall description; Stage 2 (Release 9)", V9.4.0, Jun. 2010, section 10.5, pp. 69-72.
3GPP: "3GPP TR 23.830, V9.0.0 (Sep. 2009), 3rd Generation Partnership Project; Technical Specification Group Services and System Aspects; Architecture aspects of Home NodeB and Home eNodeB (Release 9)", Sep. 1, 2009, pp. 1-56.
Chinese Office Action dated Feb. 4, 2015 in corresponding Chinese Patent Application No. 201180037542.0 with English translation of Chinese Office Action.

\* cited by examiner

ACCESS CONTROL FAILURE HANDLING FOR HENB INBOUND MOBILITY

TECHNICAL FIELD

A method and system is provided for handling access control failure during User Equipment (UE) handover to a Home evolved Node B (HeNB) in Long Term Evolution (LTE). This will prevent handover to a target HeNB repeatedly to which UE is not allowed to access anymore. It also provides solution to synchronize Closed Subscriber Group (CSG) management between UE and network.

BACKGROUND ART

In System Architecture Evolution (SAE)/LTE, Mobility Management Entity (MME) performs access control for the target CSG HeNB when there is a handover required from the source eNB/HeNB which UE attached to. MME determines if UE can access the target CSG HeNB based on the CSG ID received from Handover required message and stored CSG subscription data for the UE. If the access control fails, MME sends Handover preparation failure to source eNB/HeNB (see Non Patent Literature (NPL) 1). Source eNB/HeNB will then not send Handover command to UE therefore handover procedure will not be carried on.

However, the discarded handover is caused by access control failure, which can be caused by out of date CSG subscription data in MME and/or UE. Firstly, MME should verify if its CSG subscription data is still fresh, if not, it should retrieve a fresh one from Home Subscriber Server (HSS), and according to which MME should perform access control. If access control failed, source eNB/HeNB should indicate UE about the access control failure so that UE can update its whitelist.

CITATION LIST

Non Patent Literature

NPL 1: 3GPP TS 36.300, "Evolved Universal Terrestrial Radio Access (E-UTRA) and Evolved Universal Terrestrial Radio Access Network (E-UTRAN); Overall description; Stage 2 (Release 9)", V9.4.0, 2010-06, section 10.5, pp. 69-72

SUMMARY OF INVENTION

This invention considers access control failure and CSG management in inbound mobility procedure. When MME receives Handover required from source eNB/HeNB which contains CSG ID, it will verify whether the CSG subscription data it stores is fresh or expired. If it is expired, or if MME does not have any association data for this UE, it will retrieve the latest CSG subscription data from HSS. MME will rewrite its stored CSG subscription data with the one retrieved from HSS, if they are different.

MME will perform access control for the UE according to the CSG ID received from Handover required message and its CSG subscription data. When the access control is failed, a new message List Update Indication is proposed to be sent from source eNB/HeNB to UE. In order to indicate what caused the failure, an appropriate cause in the message is proposed. Upon receiving the List Update Indication message, UE updates its stored whitelist, such that the CSG subscription data in UE and MME are synchronized.

Advantageous Effects of Invention

MME downloads the latest CSG subscription data from HSS if its own one is expired or it does not have any, such that MME is able to keep it up-to-date. This will prevent a wrong access control thus it improves efficiency.

UE is informed about the access control failure, such that the handover procedure can be completed and UE can update its whitelist and keep it fresh.

To remove that CSG which could not pass access control prevents initializing handover procedure repeatedly, so that the signaling can be reduced and a better service can be provided by the operator.

UE and MME both are able to update their data of allowed CSG IDs, which completes the CSG management and synchronization of CSG whitelist.

DESCRIPTION OF EMBODIMENTS

Hereafter, an exemplary embodiment of a node, a base station and a UE according to the present invention, and a network system to which these node, base station and UE are applied will be described with reference to FIGS. 1 to 5. Note that the same signs are assigned to the same elements throughout the drawings, and their duplicated explanation is omitted as appropriate for clarifying the description.

The object of the invention is achieved by MME verifying its stored CSG subscription data and indicating UE about access control failure by a new message with a new cause. The message to inform updating list upon access control failure is named as List Update Indication. Based on which, UE can update its CSG whitelist and to synchronize the data with MME.

Figure 2:
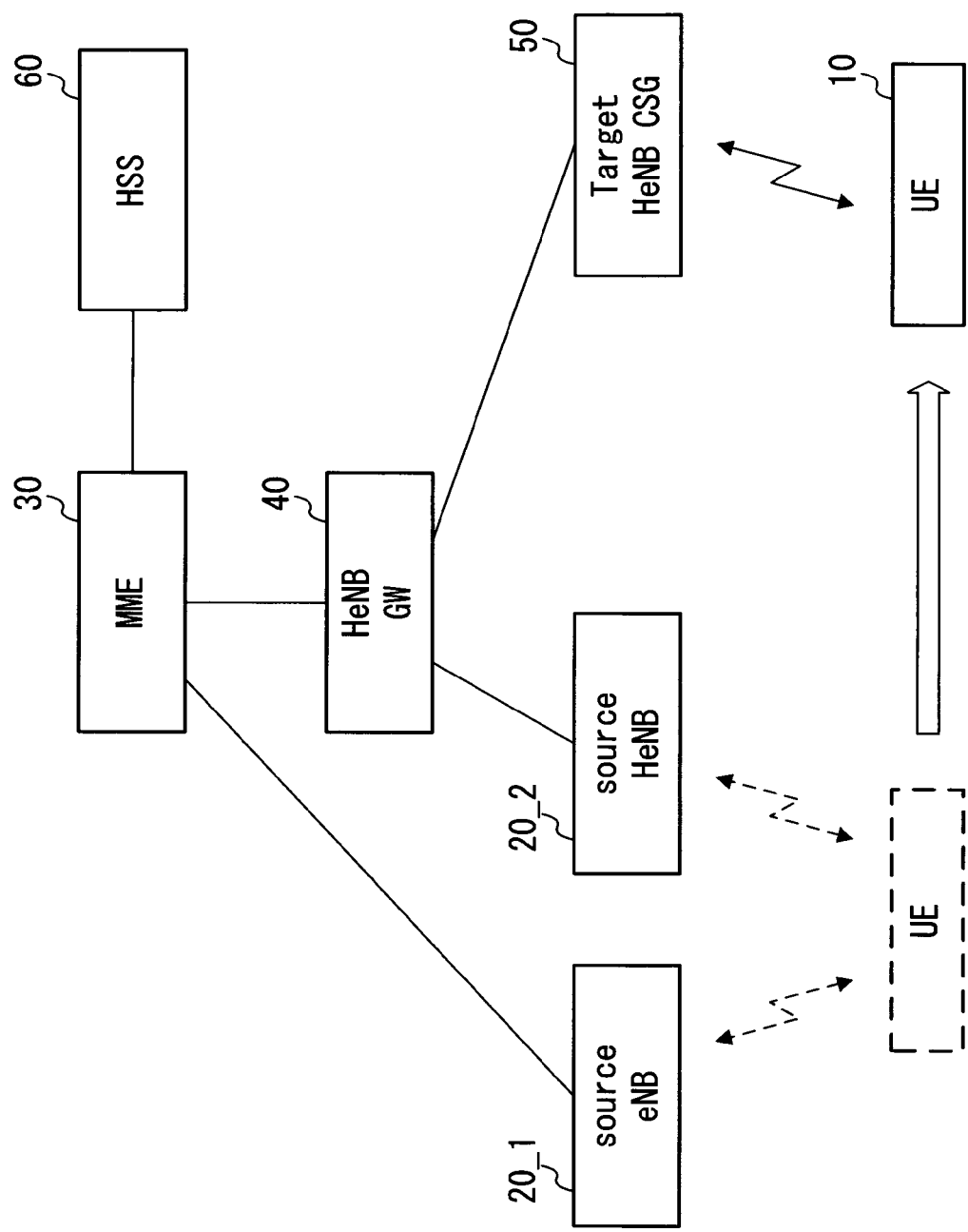
FIG. 2 is a block diagram showing a configuration example of a network system according to an exemplary embodiment of the present invention.

As shown in FIG. 2, the network system according to this exemplary embodiment includes a UE 10, an eNB 20_1, a HeNB 20_2, an MME 30, a HeNB GW (Gateway) 40, a HeNB 50, and a HSS 60. Note that the eNB 20_1 and the HeNB 20_2 are sometimes collectively referred as to the sign 20. The UE 10 includes the ability of accessing a cell formed by the eNB/HeNB 20 and a CSG cell formed by the HeNB 50. The MME 30 controls at least access from the UE 10 to the CSG cell, and retrieves subscription data on the CSG cell from the HSS 60 if necessary. The HeNB GW 40 relays traffic between the MME 30 and each of the HeNBs 20_2 and 50.

Next, an operation example of this exemplary embodiment will be described in detail with reference to FIG. 1. This operation example assumes the case of performing handover of the UE 10 from the eNB/HeNB 20 to the HeNB 50. Note that configuration examples of the UE 10, the eNB/HeNB 20 and the MME 30 will be described later with reference to FIGS. 3 to 5.

Figure 1:
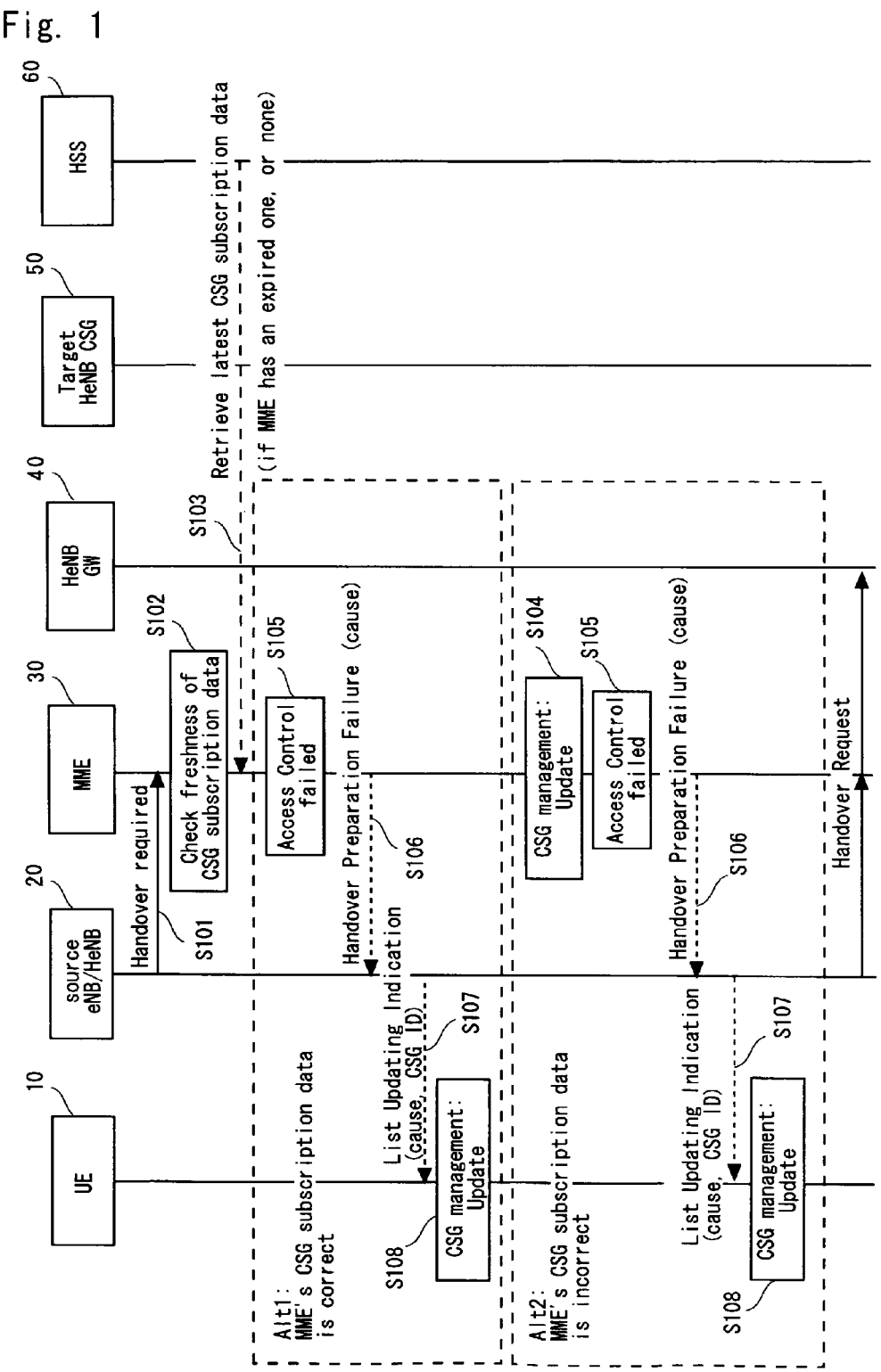
FIG. 1 is a sequence diagram showing an example of Access Control and Verification failure handling.

In handover to HeNB 50, source eNB/HeNB 20 will send Handover required message to MME 30 with a CSG ID included (Step S101 shown in FIG. 1). MME 30 is responsible to perform access control for the target HeNB 50 based on the received CSG ID and its stored CSG subscription data.

MME 30 verifies if its CSG subscription data is expired, e.g, by a timer set when last time the CSG subscription data was updated (Step S102). If its CSG subscription data is out-of-date, MME 30 send request to HSS 60 and download a latest one (Step S103). MME 30 will update its CSG subscription data if they are different (Step S104).

MME 30 performs access control, and when it is failed (Step S105), MME 30 will send an Handover Preparation Failure message to source eNB/HeNB 20 (Step S106). After received Handover Preparation Failure message, source eNB/HeNB 20 which UE 10 is attached to, sends List Updating Indication message to UE 10 with a proper cause (Step S107). UE 10 then removes the target HeNB's CSG ID from its whitelist (Step S108).

Change Request will be proposed for sub-clause 8.2 and clause 10 in 3GPP TS 33.320, V10.0.0 as follows.

8.2 Access Control Mechanisms for H(e)NB 8.2.1 Non-CSG Method

The ACL (Access Control List) based access control mechanism for a non CSG capable UE accessing the HNB or a UE accessing a non CSG capable HNB is handled in [12, 28]. The ACL shall be securely stored in and integrity protected in the I-INB if the HNB performs access control.

8.2.2 CSG Method

The CSG based access control mechanism for a CSG capable UE accessing the CSG capable H(e)NB is handled in [12].

HSS shall be able to push the latest CSG Lists (Allowed CSG List and Operator CSG List) to MME/SGSN/MSC. MME/SGSN/MSC shall update the CSG Lists on receiving updated list from the HSS. MME/SGSN/MSC shall request HSS for the latest CSG List when the CSG List expires or when the MME does not have a CSG List for the given UE.

10 Security Aspects for Mobility 10.1 Inbound Mobility

In mobility from macro NB or HNB towards HNB CSG/hybrid, access control or membership verification for CSG capable UE and non CSG capable UE shall be performed as described in [12].

Key management is done in core network as described in [20].

Access control or membership verification for UE in mobility from macro eNB or HeNB towards HeNB CSG/hybrid is handled in mobility scenario in [27].

Key handling shall follow that in [21].

When the access control of a UE fails at handover to a CSG H(e)NB the MME/SGSN shall indicate the cause of access control failure to the source (e)NB/H(e)NB and the source (e)NB/H(e)NB shall inform the cause to UE. The UE shall remove the given cell ID from its CSG List.

10.2 Outbound Mobility

For mobility from HNB, the normal procedure can be applied as stated in [28]. Key handling shall follow the macro mobility procedure.

For mobility from HeNB, the normal procedure can be applied as stated in [27]. Key handling shall follow the macro mobility procedure.

Further, Reason for change of the above-mentioned sub-clause 8.2 and clause 10, Summary thereof, and Consequences if not approved are as follows.

Reason for Change of Sub-Clause 8.2:

Description of CSG list (operator and allowed CSG list) management is spread out in different specifications that has left some holes. One such holes is the lack of synchronization of CSG lists between the HSS and MME/SGSN when it is modified. This can either lead to a UE being accepted in a CSG cell even though it should not be or vice versa. Therefore a solution is needed to synchronize the CSG list at MME/SGSN when it is actualized in HSS or when it expires in the MME/SGSN.

Summary of Change of Sub-Clause 8.2:

Added text regarding CSG list actualization in MME/SGSN.

Consequences if not Approved:

Incorrect access control can happen and that will lead to business impact to operators.

Reason for Change of Clause 10:

Cause #25 (Not authorized for this CSG) is defined for NAS messages in TS 24.301.

On reception of cause #25 in NAS messages at the UE, the CSG ID of the given cell is removed from the CSG Lists (Allowed CSG List or Operator CSG List) in the UE. However there is no such mechanism defined for handover case i.e. AS. This can lead to a UE repeatedly trying to access a given cell even though it is not allowed to. The scenario is further detailed below:

Say a CSG capable UE has CSG Lists where the CSG ID of a given cell exists while the MME/SGSN do not have the given CSG ID in their CSG Lists. Now if the UE performs a handover to a such cell then it will receive a failure message. Not knowing that the cause of handover failure is access control failure, the UE will try to access the given cell again. Thus a cause of access control failure should be indicated to the UE that will lead to the removal of the CSG ID from the CSG Lists in the UE.

Summary of Change of Clause 10:

UE is indicated about the access control failure during handover and it updates its CSG List.

Consequences if not Approved:

UE could end up endlessly trying to access a given cell although it is not allowed to do so.

Next, configuration examples of the UE 10, the eNB/HeNB 20 and the MME 30 will be described with reference to FIGS. 3 to 5.

Figure 3:
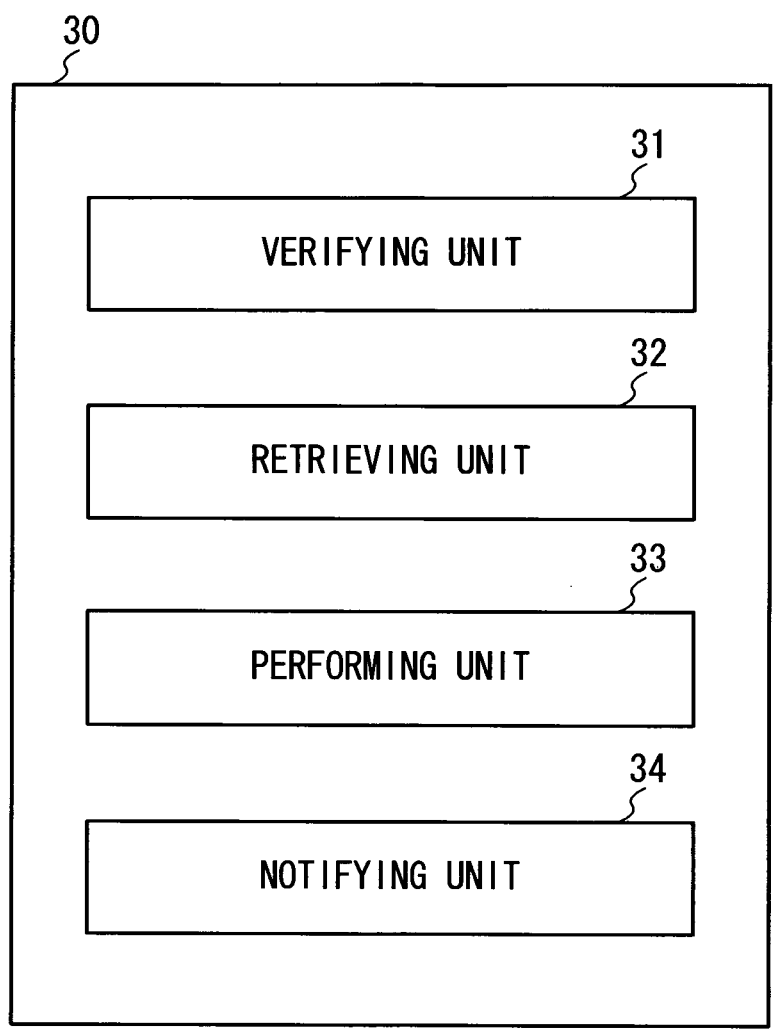
FIG. 3 is a block diagram showing a configuration example of a node according to an exemplary embodiment of the present invention.

As shown in FIG. 3, the MME 30 includes a verifying unit 31, a retrieving unit 32, a performing unit 33, and a notifying unit 34. The verifying unit 31 verifies the freshness of the subscription data on the CSG cell, upon receiving the Handover required message. When it is verified that the subscription data is expired, the retrieving unit 32 retrieves the latest subscription data from the HSS 60. The performing unit 33 performs access control for the CSG cell, based on the retrieved subscription data. When the access control is failed, the notifying unit 34 notifies the Handover Preparation Failure message to the eNB/HeNB 20.

These units 31 to 34 can be configured by, for example, transceivers which respectively conduct communication with the HSS 60 and the eNB/HeNB 20, and a controller which controls their transceivers to execute the processes shown in FIG. 1 or processes equivalent thereto. Note that although the illustration is omitted, the above-mentioned SGSN can be similarly configured.

Figure 4:
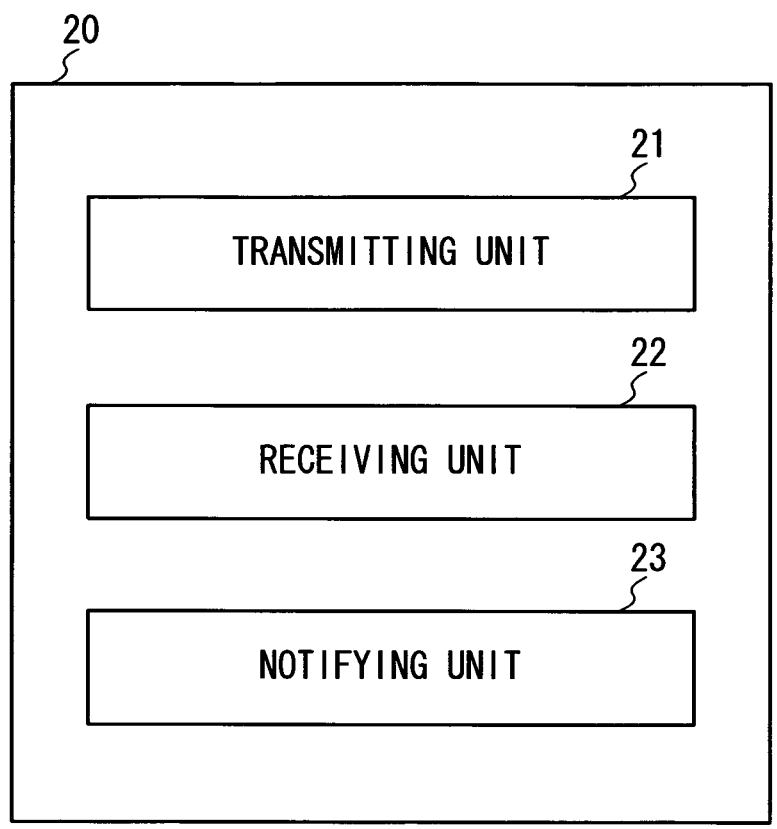
FIG. 4 is a block diagram showing a configuration example of a base station according to an exemplary embodiment of the present invention.

As shown in FIG. 4, the eNB/HeNB 20 includes a transmitting unit 21, a receiving unit 22, and a notifying unit 23. The transmitting unit 21 transmits the Handover required message to the MME 30. The receiving unit 22 receives the Handover Preparation Failure message from the MME 30. The notifying unit 23 notifies the List Updating Indication message, thereby making the UE 10 update subscription data stored in the UE 10.

These units 21 to 23 can be configured by, for example, a transceiver which conducts communication with the MME

30, a transceiver which conducts wireless communication with the UE 10, and a controller which controls their transceivers to execute the processes shown in FIG. 1 or processes equivalent thereto. Note that although the illustration is omitted, the above-mentioned NB/HNB can be similarly configured.

Figure 5:
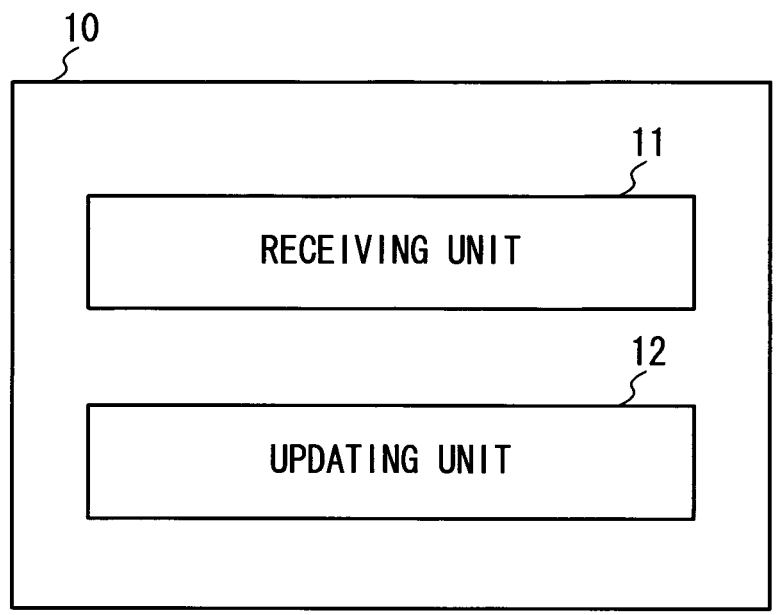
FIG. 5 is a block diagram showing a configuration example of a UE according to an exemplary embodiment of the present invention.

As shown in FIG. 5, the UE 10 includes a receiving unit 11 and an updating unit 12. The receiving unit 11 receives the List Updating Indication message from the eNB/HeNB 20. The updating unit 12 updates subscription data stored in the UE 10, upon reception of the List Updating Indication message.

These units 11 and 12 can be configured by, for example, a transceiver which conducts wireless communication with the eNB/HeNB 20, and a controller which controls this transceiver to execute the processes shown in FIG. 1 or processes equivalent thereto.

Note that the present invention is not limited to the above-mentioned exemplary embodiment, and it is obvious that various modifications can be made by those of ordinary skill in the art based on the recitation of the claims.

This application is based upon and claims the benefit of priority from Japanese patent applications No. 2010-182383, filed on Aug. 17, 2010, and No. 2010-207581, filed on Sep. 16, 2010, the disclosures of which are incorporated herein in their entirety by reference.

The whole or part of the exemplary embodiment disclosed above can be described as, but not limited to, the following supplementary notes.

(Supplementary Note 1)

MME verifies its CSG subscription data in handover procedure:

MME storages a timer to show the freshness of CSG subscription data. It will verify the freshness by checking this timer. If it shows that the CSG subscription data is expired, MME will request to HSS to download a latest version. That also applies when MME does not have any CSG subscription data.

This verification can be used in other NAS (Non-Access Stratum) procedures when access control is required. (e.g. ATTACH/DETACH REJECT, Combined ATTACH REJECT, Tracking Area Updating Reject, Combined Tracking Area Updating Reject, SERVICE REJECT, extended SERVICE REJECT and potentially any other NAS message that might be added in future).

(Supplementary Note 2)

New message of List Update Indication:

This message is sent from source eNB/HeNB to inform UE that the CSG ID it sent in measurement report can not pass access control in MME, i.e. UE has an out-of-date whitelist, or any other unexpected reason. This message is sent with a proper cause to indicate the failure.

(Supplementary Note 3)

New causes due to access control failure:

Proper causes are proposed to be sent together with List Updating Indication message. Moreover, in case of handover to CSG HeNB/hybrid cell, new causes are proposed so that Handover failure message is reused with a proper cause due to verification by target CSG HeNB.

(Supplementary Note 4)

Synchronization CSG Management in UE and MME

After received List Updating Indication message with a cause that access control is failed, both UE and MME should update their data of CSG to keep it up-to-date and synchronized.

REFERENCE SIGNS LIST

10 UE
11, 22 RECEIVING UNIT
12 UPDATING UNIT
20 eNB/HeNB
20_1 eNB
20_2, 50 HeNB
21 TRANSMITTING UNIT
23, 34 NOTIFYING UNIT
30 MME
31 VERIFYING UNIT
32 RETRIEVING UNIT
33 PEFORMING UNIT
40 HeNB GW
60 HSS

The invention claimed is:

1. A communication network node that controls access from a UE (User Equipment) to a CSG (Closed Subscriber Group) cell, the node comprising an electronic device configured to function as:
   a first verifying unit that verifies freshness of subscription data on the CSG cell, upon a request for the access;
   a second retrieving unit that retrieves, when the first verifying unit has verified that the subscription data is expired, the latest subscription data from a server;
   a third performing unit that performs access control for the CSG cell, based on the retrieved subscription data; and
   a fourth notifying unit that notifies, when the access control is failed, a cause for the failure to the transmission source of the request,
   wherein the request is transmitted from a base station to which the UE attaches, the request being for handover of the UE to the CSG cell,
   wherein the fourth notifying unit includes the cause for the failure in a response to be notified to the base station, thereby i) making the base station transfer the cause for the failure to the UE, and ii) making the UE update subscription data stored in the UE,
   in combination with the base station, and the UE, wherein,
   the node that controls access from the UE to the CSG cell is a MME (Mobility Management Entity),
   the fourth notifying unit's notification of the cause for the failure to the base station is a Handover Preparation Failure message,
   the base station's transfer of the cause for the failure to the UE is in a list updating indication message, and
   the UE's update of subscription data stored in the UE removes the CSG cell having the failed access control from the UE's stored subscription data such that subscription data in the UE and the MME are synchronized.

2. The node according to claim 1, wherein the first verifying unit verifies whether or not the subscription data is expired, based on time elapsed from the previous updating of the subscription data.

3. The node according to claim 1, wherein the second retrieving unit retrieves the latest subscription data from the server, when the node does not have any subscription data.

* * * * *